United States Patent [19]

Suzuki et al.

[11] Patent Number: 4,651,300

[45] Date of Patent: Mar. 17, 1987

[54] WORD PROCESSING APPARATUS

[75] Inventors: Makoto Suzuki; Hiroshi Koie, both of Nagoya, Japan

[73] Assignee: Brother Kogyo Kabushiki Kaisha, Nagoya, Japan

[21] Appl. No.: 584,779

[22] Filed: Feb. 29, 1984

[30] Foreign Application Priority Data

Mar. 11, 1983 [JP] Japan .................................. 58-41044

[51] Int. Cl.⁴ .............................................. G06F 7/02
[52] U.S. Cl. .................................................... 364/900
[58] Field of Search ... 364/200 MS File, 900 MS File; 340/146.3

[56] References Cited

U.S. PATENT DOCUMENTS 4,041,467 8/1977 Cota et al. ............................ 364/900
4,355,371 10/1982 Conuis et al. ........................ 364/900
4,383,307 5/1983 Gibson, III .......................... 364/900
4,413,318 11/1983 Herrington ......................... 364/200
4,503,514 3/1985 Urquhart ............................. 364/900

OTHER PUBLICATIONS

CPT Spelling Checker I., D. Wendel, Mar. 83.

Primary Examiner—Gareth D. Shaw
Assistant Examiner—Randy W. Lacasse
Attorney, Agent, or Firm—Moonray Kojima

[57] ABSTRACT

A word processing apparatus comprising a word processor which prepares and edits a document by a first CPU in response to a signal received from an input unit; and a spelling collator capable of collating the spelling of each word from an input unit with a stored correct spelling of such word, by a second CPU independently of the first CPU.

6 Claims, 3 Drawing Figures

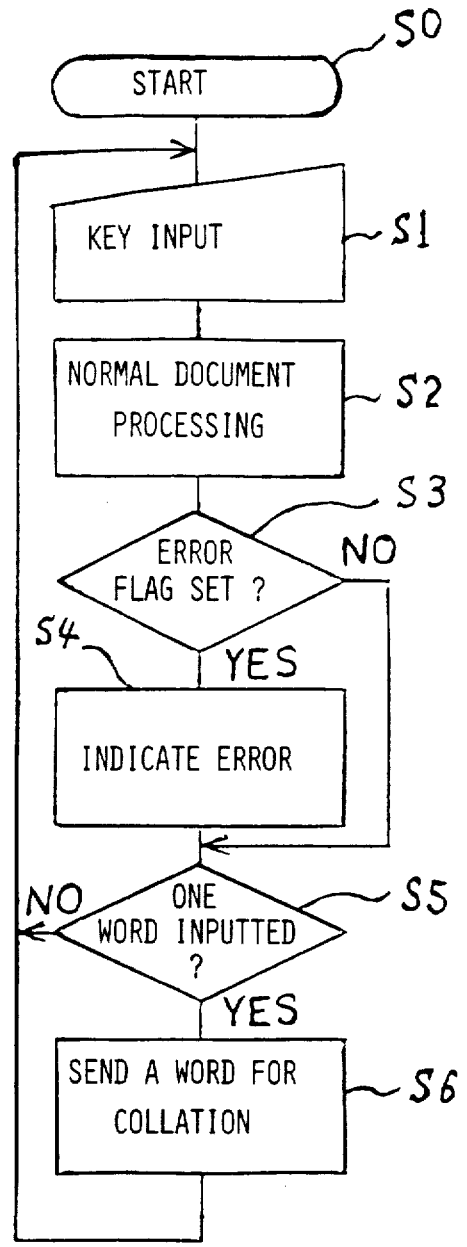

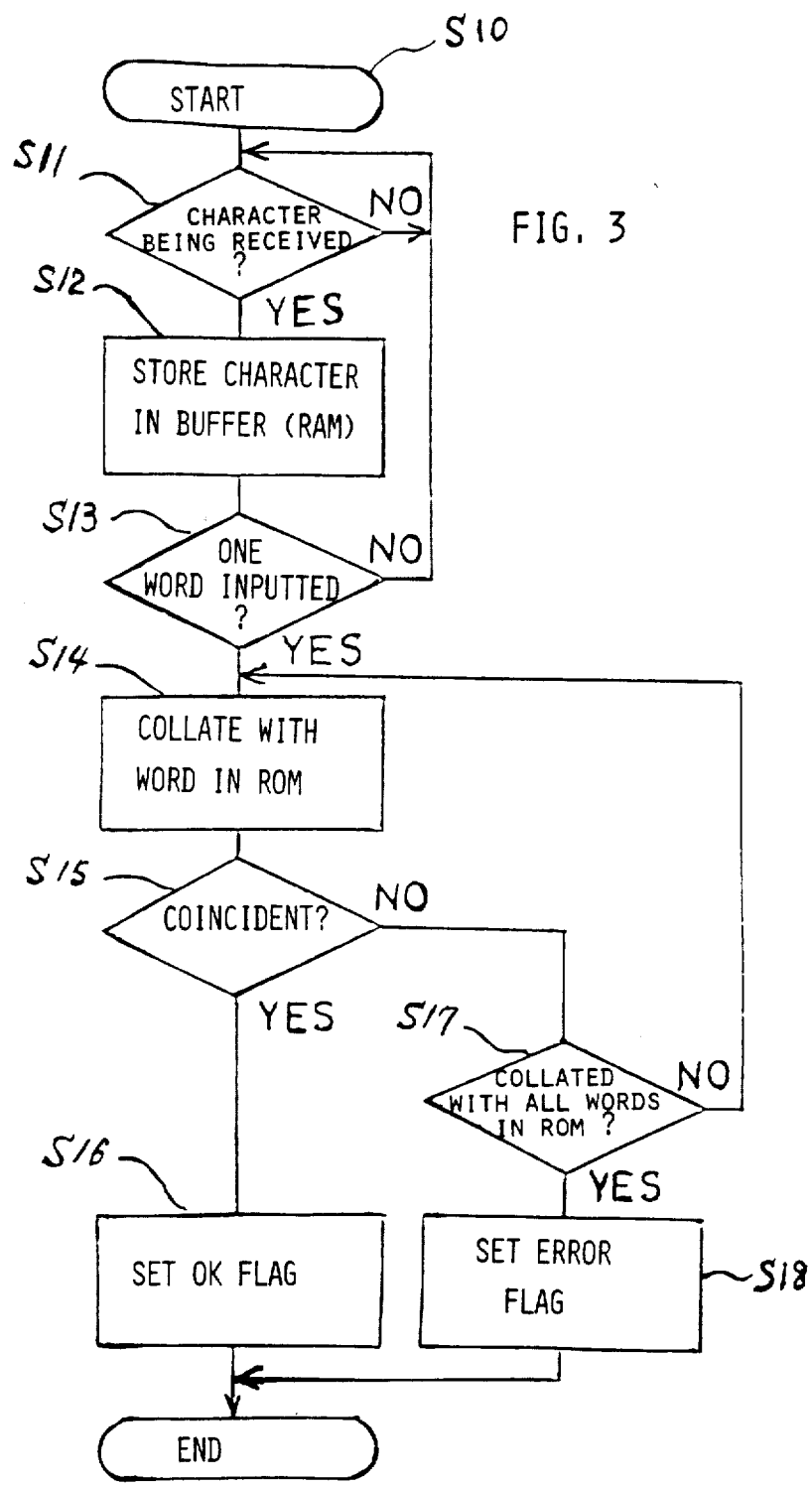

WORD PROCESSING APPARATUS

BACKGROUND OF THE INVENTION

1. Field of Invention

This invention relates to a spell collating apparatus designed for use in checking the spelling of words in a document, through connection to a word processor or the like which is used for preparing and/or proofreading the document, in cooperating with a display unit.

2. Description of the Art

When checking the spelling of words in a document inputted in a word processor or the like, it has been customary heretofore to execute a collation program after completion of inputting the entire document. This is done in such a manner that, with depression of a specified key, confirmation is performed to check to determine whether the spelling of each input word is coincident with the correct spelling stored previously in a memory unit in the word processor.

According to such a method, however, there exists a disadvantage in that during execution of the spelling collation program, it is impossible to carry out normal input processing steps, such as preparation or proofreading of a document. Moreover, disadvantageously, the execution of such a program requires a considerable amount of time which eventually induces deterioration of operational efficiency.

Therefore, the function of checking the word spelling has not be fully utilized in most cases, even though the word processor may be equipped with such a function.

SUMMARY OF THE INVENTION

Accordingly, it is an object of the invention to eliminate and overcome the aforementioned and other disadvantages and deficiencies of the prior art.

Another object is to provide an improved spelling collator capable of checking the spelling of words inputted into a word processor, without causing any harmful effect to the inputting for preparation and/or proofreading of a document and without requiring any substantial amount of labor or time.

A further object is to provide such spelling collator which is driven by a central processing unit which functions independently of a central processing unit in a word processor, whereby the spelling collation may be effected concurrently with other functions carried on by the word processor.

To accomplish the above and other objects, the invention encompasses a word processor apparatus comprising a word processor which receives from an input unit a code signal for proof reading and/or preparation and/or editing of a document or characters with reference to one or more display units, and performs such proofreading and/or preparation and/or editing of the document in a first central processing unit (hereinafter called CPU); and a spelling collator connectable to the word processor via one or more interfacing devices, and comprising a second CPU capable of checking the word spelling through collation, a read only memory (hereinafter called ROM) storing correct spelling of words and storing a spelling collation program, and a working random access memory (hereinafter called RAM) storing the words to be check for spelling, wherein the spelling of each word received from the input unit is collated (that is checked for spelling), in the second CPU, which functions independently of the first CPU, with the correct spelling stored in the ROM. Advantageously, the two CPUs function independently, and hence the word processor can concurrently with the spell collating means perform its ordinary type functions such as proof reading, editing, etc.

BRIEF DESCRIPTION OF DRAWINGS

FIG. 2 is a flow chart depicting an illustrative procedure carried out in the word processor portion of the FIG. 1 embodiment.

FIG. 3 is a flow chart depicting an illustrative procedure carried out in the spelling collator portion of the embodiment of FIG. 1.

DETAILED DESCRIPTION OF THE PREFERRED EMBODIMENTS

Figure 1:
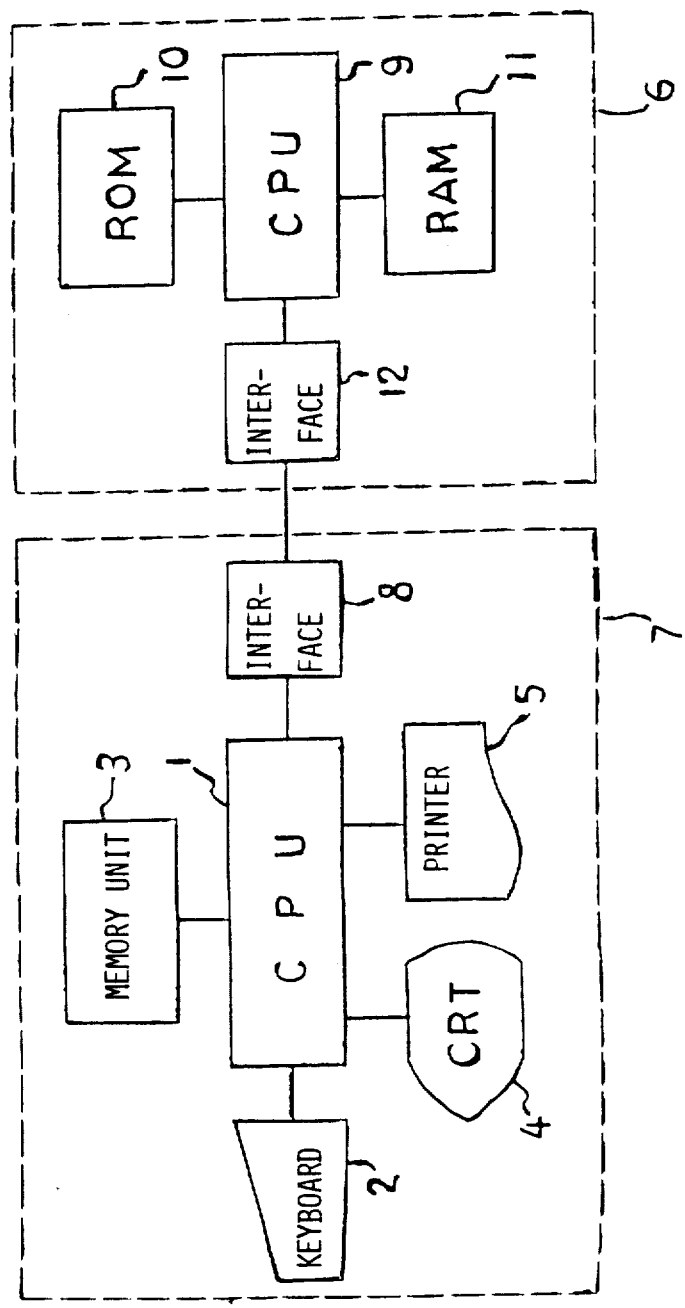
FIG. 1 depicts a block diagram of an illustrative embodiment of the invention.

Turning now to FIG. 1, there is depicted a word processor part 7 connected to spelling collator part 6 through two respective interface devices 8 and 12.

The processor 7 comprises a first CPU 1, which is provided for preparing or proofreading or editing a document and which is connected to a keyboard 2 for inputting a code signal to execute proofreading, preparation, editing or the like of characters or documents; a memory unit 3, wherein an input document is written; a cathode ray tube (hereinafter called CRT) 4 for displaying the document and/or characters and the like; a printer 5 for printing the document and/or characters and the like; and interface device 8 for enabling connection of the word processor 7 with an external spell collating apparatus 6.

Spelling collator 6 comprises a second CPU 9, which is provided for collating the spelling of words and which is connected to ROM 10, wherein correct spelling of words and a collation program are stored; a working RAM 11; and an interface device 12 for connecting spell collating apparatus 6 to word processor 7. Thus, word processor 7 and spell collating apparatus 6 are connected with each other via the respective interfaces 8 and 12. The spell collating apparatus 6 may be composed of one or more units.

Operation of the illustrative embodiment will be described with reference to the block diagram of FIG. 1 and the flow diagrams of FIGS. 2 and 3.

Collation of word spellings is executed in the following manner in response to a command code signal from keyboard 2.

As shown in FIGS. 1 and 2, first CPU 1 in word processor 7 performs after START S0, and Key Input S1, a normal document processing operation S2 of displaying a document on CRT 4, printing it using printer 5 or storing it in memory unit 3, in response to an input signal received from keyboard 2. Subsequent to completion of the input in the preceding stage, if an error flag S3 is set in the spelling collating apparatus 6 to indicate existence of an error in the spelling of the preceding word transmitted to the spell collating apparatus 6, then first CPU 1 detects such a state via the interface 8 and displays the error on the CRT 4 by, e.g. blinking that word S4. In case no error flag is set, such error display is not effected. Completion of inputting of each word is judged from the depression of a space key S5. Upon completion of inputting, a signal corresponding to the next word from keyboard 2 S6, the foregoing operation is repeated and a new word signal thus inputted is transmitted to spell collating apparatus 6 via interface 8, and concurrently the processing step for the next input signal from keyboard 2 is carried out by the first CPU 1 in succession (back to START S0).

Meanwhile, as depicted in FIGS. 1 and 3, spell collating apparatus 6 (START S10) receives via interface 12, 5 word transmitted thereto for collation from word processor 7. Such reception S11 is continued until termination of the entire signal representing one entire word, and the word to be collated is written S12 in RAM 11, which serves as a word buffer S13. Subsequently, second CPU 9 executes collation S14 to check if the spelling of the word thus written in RAM 11 coincides S15 with any of the correct spellings of a plurality of words priorly stored in ROM 10. When such coincidence is attained, an OK flag is set S16, to indicate that the spelling of the collated word is correct. In case such coincidence is not attained, after collating with all the stored words in ROM 10 S17, an error flag is set S18, to indicate that the spelling is erroneous. Thus, the spelling collation step is completed for one word. The above-mentioned spelling collation is executed with regard to all the words S17 which need to be checked for correction of spelling, and either an OK flag or an error flag is set for each word. The flag state is transmitted, as a result of spelling collation, to word processor 7 via interfaces 12.

As described in detail hereinbefore, according to the spell collating apparatus of the invention, an additional CPU provided separately and independently of the CPU in the word processor, sequentially collates the spelling of input words, independently of the normal operation of the word processor, such as preparation, editing, proofreading or the like of a document, so that the desired spelling collation can be achieved at high speed and without causing harmful interference with the normal document processing operation performed by the word processor.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A word processing apparatus comprising
    a word processor for preparing and editing a document, comprising a first central processing unit acting in response to a code signal received from an input unit, to display the document visually to a medium;
    a spell collating means comprising a second central processing unit for collating a spelling of a word of said code signal, a memory for previously storing correct spelling of words and a spelling collation program, and a working memory for storing the spelling of the word to be collated, wherein
    said second central processing unit, independently of a function of said first central processing unit, is capable of collating the spelling of the word from said word processor with the correct spelling stored previously in said memory;
    an interface device for transmitting the word of said code signal from said word processor to said spell collating means and transmitting an error signal from said spell collating means to said word processor when the spelling of the word of said code signal from said word processor is not found in said memory.

2. The apparatus of claim 1, wherein said first central processing unit sends words for collation to said spelling collator means through said interface device.

3. The apparatus of claim 2, wherein said words to be checked for spelling are directed for temporary storage in a random access memory, and then collated by said second central processing unit with the correct spelling of words stored in a read only memory, and where incorrect spelling is found, an error signal is sent through said interface device to said first central processing unit.

4. A word processing apparatus comprising
    a word processor for preparing and editing a document, comprising a firt central processing unit acting in response to a code signal received from an input unit, to display the document visually to a medium;
    a spell collating means comprising a second central processing unit for collating a spelling of a word of said code signal, a memory for previously storing correct spelling of words and a spelling collation program, and a working memory for storing the spelling of the word to be collated, wherein
    said second central processing unit is capable of collating the spelling of the preceding word from said word processor with the correct spelling stored previously in said memory when said first central processing unit displays the next word of said code signal received from said input unit to said medium;
    an interface device for transmitting the word of said code signal from said word processor to said spell collating means and transmitting an error signal from said spell collating means to said word processor when the spelling of the word of said code signal from said word processor is not found in said memory.

5. The apparatus of claim 4, wherein said first central processing unit sends words for collation to said spell collating means through said interface device.

6. The apparatus of claim 5, wherein said words to be checked for spelling are directed for temporary storage in a random access memory, and then collated by said second central processing unit with the correct spelling of words stored in a read only memory, and where incorrect spelling is found, an error signal is sent through said interface device to said first central processing unit.

* * * * *